United States Patent [19]

Davis

[11] Patent Number: 4,637,965

[45] Date of Patent: Jan. 20, 1987

[54] ANTICORROSION BATTERY TERMINAL

[75] Inventor: Ronald G. Davis, Erick, Okla.

[73] Assignees: H. Milton Keathley; Douglas Michael Phenix, both of Erick, Okla.

[21] Appl. No.: 800,872

[22] Filed: Nov. 22, 1985

[51] Int. Cl.$^4$ ............................................. H01M 2/30
[52] U.S. Cl. ........................................ 429/1; 429/178; 429/179
[58] Field of Search .................... 429/178, 179, 121, 1; 339/32 R, 33, 49 R, 151 M, 152, 184 R, 184 M, 185 R

[56] References Cited

U.S. PATENT DOCUMENTS

| | | | |
|---|---|---|---|
| 2,162,265 | 6/1939 | Loomis | 339/32 R |
| 3,519,977 | 7/1970 | Swearingen | 339/185 R |
| 3,625,774 | 12/1971 | Rodgers | 429/121 |
| 3,770,511 | 11/1973 | Winterbottom et al. | 429/121 |
| 3,937,636 | 2/1976 | Slautterback | 429/179 |

FOREIGN PATENT DOCUMENTS 0519783 4/1940 United Kingdom ..................... 429/1

Primary Examiner—Donald L. Walton
Attorney, Agent, or Firm—Robert K. Rhea

[57] ABSTRACT

In an automotive wet cell storage battery having positive and negative terminal posts a pair of pigtail leads are integrally joined at one end of the respective posts and covered with a dielectric material. The other end of the pigtail leads are connected with a single or individual receptacles disposed remote from the battery for cooperative reception of prongs on a cooperating plug connector electrically connecting the battery to a load, such as a vehicle electric circuit.

1 Claim, 4 Drawing Figures

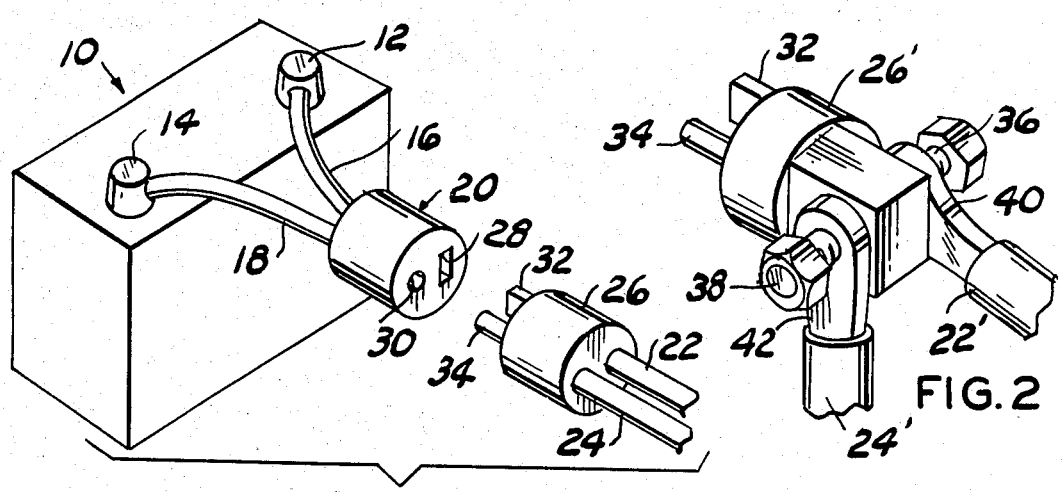
FIG. 1
FIG. 2
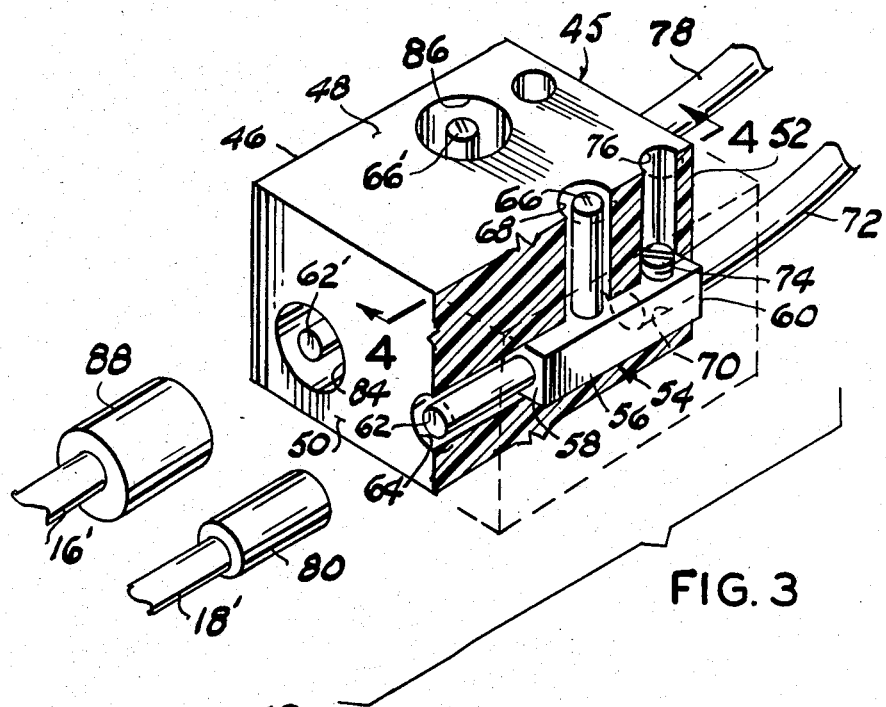
FIG. 3
FIG. 4

ANTICORROSION BATTERY TERMINAL

BACKGROUND OF THE INVENTION

1. Field of the Invention

The present invention relates to a wet cell storage battery, as used in vehicles, and more particularly to anticorrosion battery terminals.

Vehicle storage batteries are provided with positive and negative terminals commonly called "battery posts" which are respectively surrounded by a clamp attached to a conductor energizing the vehicle electric system through an electric motor starter and completing the circuit by connecting the negative terminal to ground on the vehicle. The electrolyte acid of vehicle storage batteries induces a current inhibiting corrosion which forms on exterior surfaces of the battery post and the surrounding cable clamp as well as progressively becoming interposed between the contiguous surfaces of the battery post and clamp. The gradual build-up of this corrosion usually goes unnoticed until it results in insufficient current to the starting motor of a vehicle necessitating cleaning affected parts or in some cases replacing the cable, or the like.

This invention substantially eliminates battery acid induced corrosion at the terminals of a wet cell storage battery.

2. Description of the Prior Art

Prior attempts to eliminate battery terminal and cable corrosion have generally been unsuccessful, one attempt being forming a battery post cable or clamp with a metal-type screw which is screwed into each battery terminal post a selected distance. Some batteries presently in use are provided with side terminals comprising a threaded socket into which a screw on the respective conductors engages the battery socket threads. The screw-type connectors, while showing considerable improvement over the battery post surrounding clamp-type of connection, have not satisfactorily eliminated corrosion for the reason that with time corrosion still occurs and collects between the peaks and valleys of the respective above described threaded connection resulting in considerable resistance to be overcome or an inadequate path for current, particularly when the current demand is high as when starting the vehicle.

This invention solves the above problems by eliminating any separable connection between vehicle storage battery post and the conductors attached thereto.

SUMMARY OF THE INVENTION

A pair of pigtail leads are respectively integrally connected or bonded at one end to the respective terminal post of a wet cell storage battery. The terminals and leads are each covered with a dielectric material. The length of the pigtail leads are at least equal to the greatest dimension of the battery and project laterally therefrom. The ends of the pigtail leads, remote from the battery, are joined in juxtaposed relation to a polarized receptacle featuring a pair of sockets of a selected cross sectional shape, for example, rectangular and round as a designation between the positive and negative posts with which the leads are respectively connected. This polarized socket equipped receptacle cooperatively receives the prongs of a mating plug connector for respectively connecting the positive and negative battery cables to the starter and ground of a vehicle.

Other embodiments of the plug connector are provided as options which permit retrofitting vehicles for accepting the pigtail lead battery as well as providing jump start cable terminals.

The principal object of this invention is to provide electrical connectors between a wet cell storage battery and a vehicle electric circuit which eliminates corrosion of battery terminals and conductors connected therewith.

BRIEF DESCRIPTION OF THE DRAWINGS

FIG. 1 is a perspective view of a battery having pigtail leads permanently connected therewith and illustrating a battery lead receptacle and mating plug connector in exploded relation;

FIG. 2 is a fragmentary perspective view of another embodiment of a plug connector for the battery leads of the battery in FIG. 1;

FIG. 3 is a perspective view, to a larger scale, with parts broken away for clarity, of another embodiment of a plug connector; and, FIG. 4 is a vertical cross sectional view, to a further enlarged scale, taken substantially along the line 4—4 of FIG. 3.

DESCRIPTION OF THE PREFERRED EMBODIMENTS

Like characters of reference designate like parts in those figures of the drawings in which they occur.

In the drawings

The reference numeral 10 indicates the substantially conventional direct current wet cell storage battery commonly used in vehicles powered by internal combustion engines which require an electrical circuit. The battery 10 is provided with terminals commonly referred to as "positive" and "negative" posts, indicated at 12 and 14.

According to the invention, these terminals of posts are integrally connected or bonded to a pair of pigtail leads or cables 16 and 18 joined at their other ends to a polarized receptacle 20. The vehicle cables or conductors 22 and 24, normally connecting one battery post with the vehicle starter and connecting the other battery post to ground, are both joined to a plug connector 26 mating with the pigtail lead receptacle 20. In the example shown, the receptacle 20 is elongated and provided with a rectangular socket 28 and a cylindrical socket 30 extending longitudinally of the receptacle body in parallel spaced relation which respectively cooperatively receive prongs 32 and 34 formed on the connector 26.

Referring to FIG. 2, the plug connector 26' is similarly equipped with the prongs 32 and 34 at one end and respectively are connected through the connector body with laterally projecting screw threaded bolt-like shafts 36 and 38, each having a nut thereon for receiving apertured end terminals 40 and 42 respectively secured to the adjacent ends of the vehicle conductors 22' and 24'.

Referring now to FIGS. 3 and 4, another embodiment of the plug connector is illustrated at 45 which comprises a polygonal dielectric material body 46 substantially rectangular in the example shown, having a top surface 48 and opposing end surfaces 50 and 52. A pair of terminals 54, only one being shown, are embedded in longitudinal parallel spaced-apart relation between the opposing ends 50 and 52 of the body 46 and between its upper and lower surfaces. The terminals 54 are identical and only one will be described in detail in the interest of brevity.

The terminal 54 comprises an elongated body portion 56 having opposing ends 58 and 60 respectively disposed in spaced relation inwardly of the connector body end surfaces 50 and 52. The terminal end surface 58 is centrally provided with an axial cylindrical projection or prong 62 terminating in the plane of the connector end surface 50 and is loosely surrounded by a cylindrical recess 64 in the connector body of selected diameter. Similarly, a lateral projection or prong is formed by a cylindrical stem 66 integrally connected with the terminal body 56 intermediate its ends and projects vertically upward, as viewed in FIG. 3, terminating in the plane of the connector top surface 48. This auxiliary lateral prong 66 is similarly surrounded by a cylindrical recess 68, preferably diametrically equal with the cylindrical recess 64. The other end 60 of the embedded terminal 54 is centrally drilled longitudinally to form a socket 70 for cooperative reception of the terminal end of the several wires of a multiple wire automotive conductor or lead 72. A set screw 74, threadedly received by the embedded terminal body 54, clamps the end portion of the cable 72 within the socket 70. Access to the set screw 74 is gained by a cylindrical recess 76 formed in the connector body 46 through its top surface 48.

The other vehicle cable or conductor 78 is identically connected with the other one of the pair of terminals 54. The battery terminal pigtail lead 18', formed separately from its companion pigtail lead 16', is provided at its end opposite the battery with a cylindrical receptacle 80 having an outside diameter and length cooperatively received by the recess 64 and having an axial socket with an inner wall surface 82 formed on a diameter electrically contacting the perimeter of the prong 62. The other embedded conductor of the pair of conductors 54 has its axial prong 62' surrounded by a cylindrical recess 84 of substantially greater diameter than the diameter of the recesses 64 and 68 for indicating polarity and cooperatively receiving the larger diameter cylindrical receptacle 88 similarly connected with the battery pigtail lead 16'. Similarly, the other lateral prong 66' is surrounded by a cylindrical recess 86 diametrically substantially equal with the recess 84. The purpose of the prongs 66 and 66' is for accepting the ends of jump start cables, not shown.

As best shown by FIG. 4, each of the receptacles are characterized by an electrical conductive sleeve 90 electrically connected to the wires of the lead 18' that with the inner peripheral surface 82 of the sleeve snugly contacts the respective prong when joined therewith. Each of the several cables or leads are covered with dielectric insulating material in a conventional manner.

Obviously the invention is susceptible to changes or alterations without defeating its practicability. Therefore, I do not wish to be confined to the preferred embodiment shown in the drawings and described herein.

I claim:

1. In a vehicle lead acid storage battery having terminal posts and a pair of elongated pigtail leads respectively integrally connected at one end portion with said posts, the improvement comprising;

electrically insulated connector means including a receptacle portion indicating polarity on the other end portion of each lead of said pair of pigtail leads; and, a plug portion remote from the battery electrically connecting the receptacles with a conductor, said plug portion comprising, a plug body from dielectric material having opposing spaced-apart parallel end surfaces and having a top surface normal to the end surfaces, a pair of elongated electrically conductive terminals embedded in parallel spaced relation within said dielectric material body between said end surfaces, a first prong projecting axially toward said one end surface from one end of each terminal and terminating adjacent but spaced inwardly with respect to said one end surface, an axial socket formed in the other end of each terminal for electrical connection with vehicle cable conductors, said dielectric material body having first and second polarity indicating cylindrical recesses respectively surrounding the first and second prongs; and, a laterally projecting prong on each terminal intermediate its ends projecting toward said top surface, said top surface having other polarity indicating recesses respectively surrounding the laterally projecting prongs.

* * * * *